United States Patent [19]

Lindelöw

[11] Patent Number: 5,178,476
[45] Date of Patent: Jan. 12, 1993

[54] APPARATUS FOR RECORDING AND/OR READING INFORMATION

[75] Inventor: Ernst C. G. Lindelöw, Täby, Sweden

[73] Assignee: Digital Equipment Corporation, Maynard, Mass.

[21] Appl. No.: 647,905

[22] Filed: Jan. 30, 1991

[30] Foreign Application Priority Data

Feb. 2, 1990 [SE] Sweden .................. 9000372

[51] Int. Cl.$^5$ .................................... B41J 11/20
[52] U.S. Cl. ......................... 400/352; 400/55; 400/56
[58] Field of Search ............ 400/55, 56, 57, 58, 400/59, 60, 1, 352, 353; 101/93.48

[56] References Cited

U.S. PATENT DOCUMENTS

| 3,447,455 | 6/1969 | Shneider | 101/93 |
| 3,523,992 | 8/1970 | Bickoff | 101/93.48 X |
| 3,912,068 | 10/1975 | Kwan | 400/596 X |
| 4,174,908 | 11/1979 | Wehler | 400/56 |
| 4,189,244 | 2/1980 | Harrison | 400/55 |
| 4,420,269 | 12/1983 | Ackermann | 400/356 |
| 4,883,375 | 11/1989 | Karube | 400/55 |

FOREIGN PATENT DOCUMENTS

| 999636 | 11/1976 | Canada | 400/55 |
| 1774846 | 11/1971 | Fed. Rep. of Germany . | |
| 2239117 | 2/1974 | Fed. Rep. of Germany | 400/55 |
| 3112079 | 11/1982 | Fed. Rep. of Germany | 400/59 |
| 82776 | 5/1983 | Japan | 400/24 |
| 7075 | 1/1984 | Japan | 400/59 |
| 7076 | 1/1984 | Japan | 400/59 |
| 179774 | 8/1986 | Japan | 400/55 |
| 97869 | 5/1987 | Japan | 400/55 |
| 211176 | 9/1987 | Japan | 400/55 |
| 1589356 | 11/1977 | United Kingdom . | |

OTHER PUBLICATIONS

IBM Technical Disclosure Bulletin; vol. 26; No. 3B; Aug. 1983; "Printhead Spacing Adjustment for Paper Thickness"; D.K. Rex.

Primary Examiner—Edgar S. Burr
Assistant Examiner—Eric P. Raciti
Attorney, Agent, or Firm—Ronald E. Myrick; Barry N. Young; Ronald C. Hudgens

[57] ABSTRACT

A carriage is displaceable parallel to a record carrier and supports a head displaceable in a direction essentially perpendicular to the record carrier. In order to obtain a mounting free of play while maintaining parallelism of the head during its movement and at the same time reduce the risk of damage to the head in the event of a collision, the head is supported by at least one leaf spring pair. Each leaf spring pair consists of a front and a rear leaf spring attached between the carriage and the head in attachment points. The connecting lines between the attachment points of the leaf springs substantially form a parallelogram. The apparatus is used as a printer for printing information on record carriers of paper type.

6 Claims, 1 Drawing Sheet

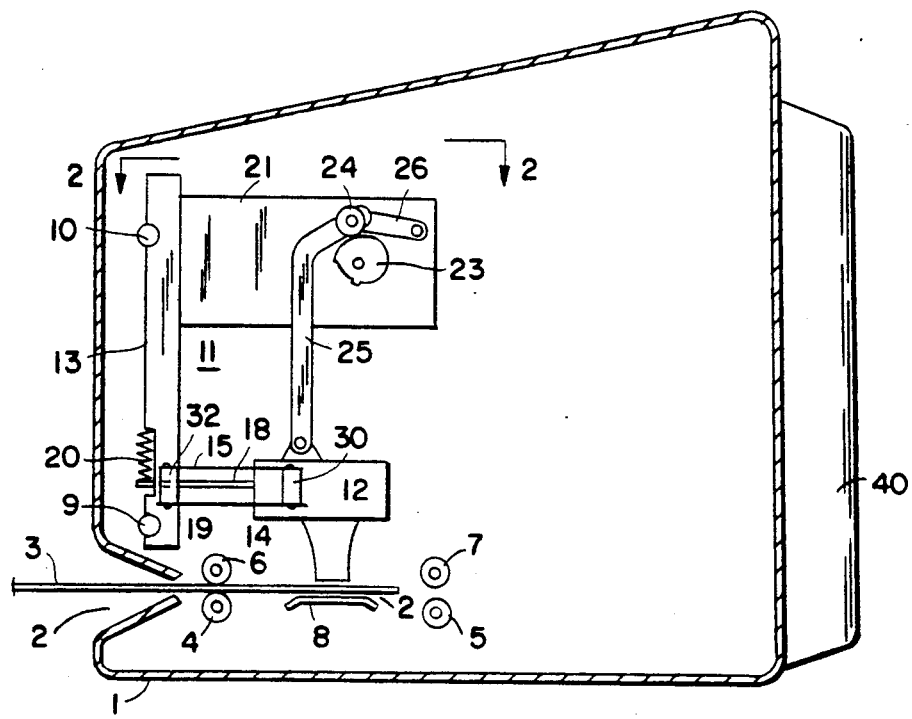
FIG. 1
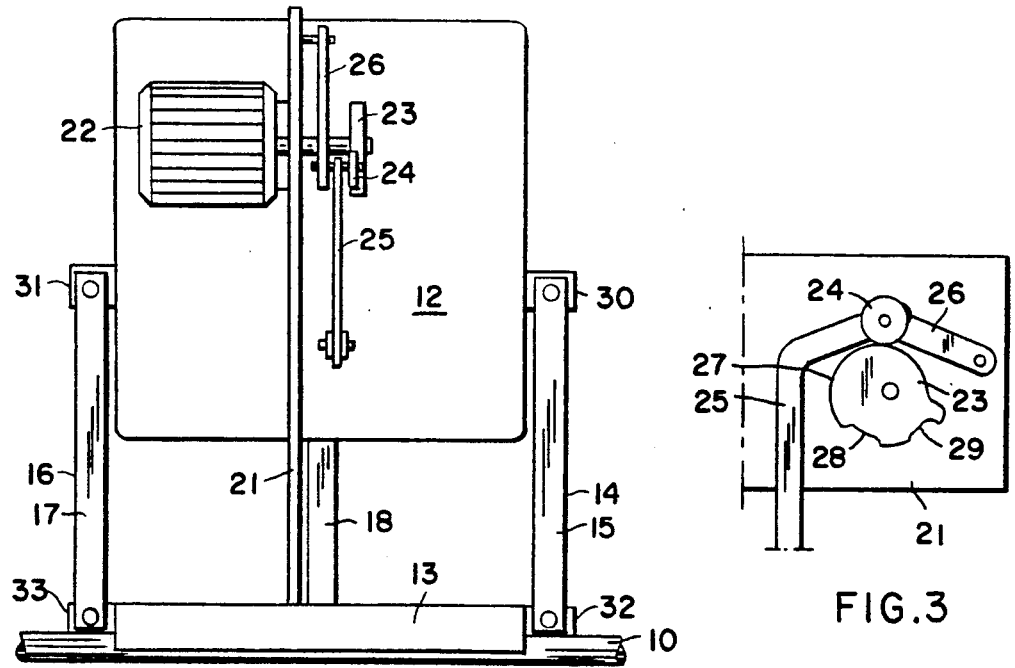
FIG. 2
FIG. 3

APPARATUS FOR RECORDING AND/OR READING INFORMATION

FIELD OF THE INVENTION

The present invention relates to an apparatus for recording information on a record carrier and/or reading information from the same, comprising a carriage carrying a recording and/or reading head, the carriage being displaceable in a direction parallel to the record carrier and the recording and/or reading head being movable transversely to the displacement direction of the carriage in a direction essentially perpendicular to the record carrier by means of a drive motor. Apparatus according to the above are used as printers for printing information on record carriers of mainly paper type. In that case the head may consist of, e.g., a pin, or needle printing head or another suitable existing printing head.

Of interest is commonly owned copending Application entitled "Apparatus for Recording and/or Reading Information by B.V.H. Eriksson, Ser. No. 647,863 filed concurrently herewith.

BACKGROUND OF THE INVENTION

An apparatus of the above stated kind is previously known from SE B 7712710-8corresponds to U.S. Pat. No. 4,174,908. The head is displaced in a direction perpendicular to the plane of the record carrier along a guide rod by means of the drive motor, which is in engagement with a toothed gear rack via a gear wheel coupling. Embodiments of transport devices according to the prior art move the head in a direction perpendicular to the record carrier, but however, present a number of disadvantages. The transfer of motion from the motor to the head commonly exhibits a play and in particular when used for some time. The play results in a less accurate positioning of the head and tends to cause jerkiness in the movement of the head, in particular when changing drive direction for the motor. This results in a distorted text, i.e. due to the fact that the head has a tendency to rise during acceleration and sink during retardation. As an example of one of the appearing distortion types is that the characters exhibit a varying character distance. Furthermore, there maybe a risk that the head is damaged in the case that a sudden rapid adjustment of the head position is needed to avoid a collision with the record carrier or another obstacle. In this case distance controlling system which the apparatus according to the above commonly is equipped with, does not have time to adjust the head position to avoid a collision.

SUMMARY OF THE INVENTION

It is an object of the present invention to obtain an apparatus according to the above, which does not exhibit the above mentioned drawbacks and which furthermore is simple in its construction, provides an accurate parallelism between the head and the record carrier and which requires less service than prior art apparatus.

According to the invention the object is obtained by means of an apparatus in that the recording and/or reading head is supported by at least a front and a rear leaf spring fixedly attached at the carriage and the head in attachment points so that the connecting lines between the attachment points of the leaf springs essentially form a parallelogram. A supporting of the head by means of leaf springs according to the invention admits a displacement free from play of the head in a direction perpendicular to the record carrier. When colliding with rapidly occurring obstacles, e.g., a thickening in the record carrier, the head by means of the support may be displaced backwards almost instantaneously to avoid damage to the head. Due to the leaf spring support according to the invention, it is ensured that the head always is directed in parallel with the record carrier which is essential for the printing quality.

It is to be observed that in this connection it is known from SE B 403 326 which corresponds to British Patent 1589356 to support a head by means of two springs. In this case the head is supported by a front leaf spring around which the head is tilted and a rear helical spring, the expansion of the helical spring causing the head to tilt. The supporting of the head results in that the normal to the front plane of the head will point in different directions in dependence of the expansion assumed by the helical spring. The variation in direction of the normal badly influences the printing quality and is avoided by the leaf spring arrangement according to the present invention, the attachment points of which are being the corners of a parallelogram.

It is also to be observed that the principle to carry a movable section in a pair of springs consisting of a front and a rear spring, per se is previously known in connection with heads from, e.g., DE "Offenlegungsschrift" No. 1 774 846 which corresponds to U.S. Pat. No. 3,447,455. However, a support of individual printing hammers is in question and not a complete head. In this case the spring pairs are only used to obtain an impact movement towards a printing drum and not for the adjustment of the distance of the supported section, which is the case in the apparatus according to the present invention, in which one or a number of front and rear leaf springs are included in the arrangement to obtain an accurate adjustment of the distance between the head and the record carrier at the same time as a head is carefully protected against damages.

According to a favorable embodiment of the present invention the head is preloaded in a direction towards the record carrier and that the drive motor by means of a link arm coupled between the drive motor and the head displaces the head from the record carrier in a direction essentially perpendicular to the record carrier. Accordingly, the movement of the head is obtained by means of a cooperation between two forces operating in opposite directions, one force in the shape of the preloading of the head and a force in the opposite direction in the shape of the power transmission from the drive motor. In the preloading of the head is included the sum of the forces on the head operating springs and the influence of the weight of the head dependent on its orientations all in consideration of signs. This force cooperation gives the head a well defined and stable movement.

According to another favorable embodiment the link arm is disengageably coupled to the drive motor. In the case that the head is subjected to a force exceeding the preloading force and which is oppositely directed and, e.g., may be caused by the head hitting a sudden thickening of the record carrier or another obstacle which the distance controlling system does not have time to correct, the head is allowed to be displaced backwards by means of the disengageable coupling of the link arm to the drive motor.

According to a further advantageous embodiment the link arm is coupled to the drive motor via a cam provided on the shaft of the drive motor, the cam guiding the movement of link arm. Cooperation between the link arm and the cam permits an accurate adjustment of the head position at the same time as the link arm is easy to disengage from the cam and the drive motor.

An adequate preload bias force of the head against the record carrier is according to a favorable embodiment obtained by use of the leaf springs as operating springs on the head. This embodiment is characterized in that the leaf springs supporting the head operate on the head in a direction towards the record carrier. According to another embodiment an adequate preload bias force is obtained by one or several separate springs and this embodiment is characterized in that one or several separate springs are provided to operate on the head in a direction towards the record carrier.

The number of springs supporting the head in the apparatus may vary, but according to a favorable embodiment the head is supported by two front and two rear leaf springs and according to another advantageous embodiment the head is supported by two front and one rear leaf spring. The two last mentioned embodiments constitute simple but nevertheless stable and free from play constructions. The embodiment having three leaf springs is furthermore a non-overdefined system and due to that particularly easy to mount and adjust.

These and other aspects of the invention will be apparent from and elucidated with reference to the embodiments described hereinafter.

BRIEF DESCRIPTION OF THE DRAWINGS

The invention will now be described in more detail with the reference to the accompanying drawings, in which:

FIG. 1 is a side sectional elevation view of the apparatus according to the invention, FIG. 2 is a plan view taken along lines 2—2 in FIG. 1 of a carriage provided with a head, FIG. 3 more clearly illustrates the cooperation between a link arm coupled to the head and a cam curve.

DESCRIPTION OF A PREFERRED EMBODIMENT

According to FIG. 1 the apparatus for recording information on a record carrier and/or reading of the same is provided with an envelope 1 having an input-/output opening 2 for a record carrier 3. The envelope 1 is shown with one side removed in the figure. In the rear section of the apparatus there is a space 40 for the electronics of the apparatus. In order to feed in or feed out, the record carrier 3, the envelope accommodates two roll pairs 4, 6 and 5, 7 each having a feed roll 4 and 5, respectively, and a pressure roll 6 and 7, respectively. A print bar 8 is schematically shown between the front roll pair 4, 6 and the rear roll pair 5, 7. Two parallel rods 9, 10 are located perpendicular to the plane of the drawing carry a carriage 11 provided with a print head 12.

The carriage 11 will now be described in more detail with reference to FIGS. 1 and 2, in which FIG. 2 shows a plan view of the carriage only, in a direction towards the record carrier along lines 2—2 in FIG. 1. The carriage 11 comprises a base plate 13 which is mounted in a displaceable way on the rods 9, 10 to obtain a displacement parallel to the record carrier 3. The head 12 is supported by the base plate 13 by two pairs 14, 15 and 16, 17 of leaf springs, one pair 14 and 15 being visible in FIG. 1. The two pairs of leaf springs are fixedly attached at the head 12 and the base plate 13 so that the connecting lines between the attachment points for each leaf spring pair forms essentially the geometric shape of a parallelogram. By means of the fixed attachment of the leaf springs the bending of the leaf springs will take place completely between the attachment points and the leaf springs are bent to a shape similar to an S. In FIGS. 1-2, the leaf springs are attached in respective projecting sections 30-31 on the head 12 and projecting sections 32-33 on the base plate 13. The leaf springs 14-17 are fixed to the projecting sections 30-33 by means of schematically indicated joints, e.g., screws. Other ways of fastening the leaf springs are welding, soldering or gluing. The attachment of the leaf springs in the head are advantageously provided in the vicinity of the central point of the head. A stiff arm 18 projects from the head 12 and through an opening 19 in the base plate 13 to connect the outer end of the stiff arm 18 with a spring 20 is a compression type, 20. The spring operates between the base plate 13 and the outer end of the arm 18 and operates on the head in a direction towards the record carrier 3 and towards the print bar 8. The stiffness of spring 20 is much higher than the stiffness of springs 14-17 and therefore the preloading of the head with a bias force is mainly done by spring 20. A plate 21 is provided at a right angle to the base plate 13. A drive motor 22 shown in FIG. 2 and, preferably a step motor, is fixed to plate 21. The drive motor 22 is coupled to the head 12 by means of a curve cam 23 arranged on a drive shaft and cooperating with a cam wheel 24 in one end of a link arm 25, the other end of cam follower arm 25 being pivotally fixed to the head 12. A link arm 26 is pivotally mounted in a bearing in the plate 21 in one of its ends and in the center of the wheel 24 in the other end. Arm 26 keeps the link arm 25 and the wheel 24 in position for cooperation between the wheel 24 and the cam 23.

The cam 23 is shown more clearly in FIG. 3 together with the cooperating wheel 24, which is mounted on the partly shown link arm 25.

By rotating the cam 23 by the drive motor 22 the position of the link arm 25 is influenced and thereby the position of the head 12. An adjustment of the head 12 position in a direction perpendicular to the record carrier is obtained in this way. Suitably, the drive motor 22 is controlled by a distance controlling system, not shown, measuring the distance between the head 12 and the record carrier 3 and regulating the drive motor so that a desired distance is adjusted. The cam 23 (FIG. 3) has a relatively gradual rising section 27, which is used for the distance adjustment of the head. One of the depressions 28 or 29 may be used to calibrate the drive motor. Normally the drive motor is a step-motor and its position may be related to one of the depressions 28, 29. By returning to the position of the depression, it is possible to check if the step-motor has lost its reference orientation and if so, restore it.

The embodiment described with reference to FIG. 1-3 is not intended to constitute a restriction of the invention but within the scope of the invention there are a number of advantageous embodiments.

For example, the preload biasing of the head in the direction towards the record carrier may be obtained in different ways. It is possible to obtain an adequate preload bias of the head in a direction towards the record carrier by only the leaf springs 14-17 supporting the head. Instead of the shown helical compression spring 20 other types of pressure springs may be used. A suitable spring consists of a spring bent to an essentially semi-circular shape, one end of which presses against the base plate 13 and the other end of which presses against the rigid arm 18 projecting from the head 12. In an alternative embodiment the pressure spring may be arranged directly between the head and a spring holder mounted on the upper side of the base plate.

In the described embodiment the head is supported by four leaf springs arranged to support the head in one corner each. In an alternative embodiment within the scope of the invention the two rear leaf springs may be replaced by one single leaf spring which preferably is placed half way between the positions of the two rear leaf springs to be replaced. The head maybe supported by one front and one rear leaf spring.

What is claimed is:

1. An apparatus for reading or recording information on a record carrier comprising:
    means for receiving said record carrier;
    a record read or recording head;
    a carriage carrying said head;
    means resiliently supporting the head on the carriage for displacement in a direction substantially perpendicular to the received record carrier, said means resiliently supporting including front and rear leaf spring head supports fixed to the carriage and to the head at attachment points spaced so that connecting lines between the attachment points essentially form a parallelogram, said leaf spring head supports being oriented such that the major surfaces of said leaf spring head supports are substantially parallel to said record carrier;
    a motor driven cam; and
    a cam linkage in cam following relationship with the cam, such linkage including a link arm having one end connected to the head beyond the attachment points of the leaf springs and a second end pivotally connected to a fixed point and engaged between said ends by the cam during rotation of the cam to displace the head in a direction substantially perpendicular to the received record carrier.

2. The apparatus as claimed in claim 1 wherein the leaf spring head supports are positioned to urge the head in a direction towards the record carrier.

3. An apparatus as claimed in claim 1 wherein the supports include two front and two rear leaf springs.

4. An apparatus as claimed in claim 1 wherein the supports include two front and one rear leaf spring.

5. An apparatus as claimed in claim 1, including means for preloading the head in a direction towards the received record carrier, the means for preloading comprising:
    a compression spring having two ends, one of the ends being attached to the carriage, and
    a rigid arm having two ends, one of the ends of the rigid arm being attached to the other end of the compression spring, and the other end of the rigid arm being attached to the head.

6. An apparatus as claimed in claim 1, wherein the link arm extends vertically upward from the head and includes a curved portion at its upper end, the curved portion terminating above the cam, and further comprising means for disengageably coupling the link arm to the motor driven cam comprising:
    a wheel rotatably mounted at its center to the upper end of the link arm in contact with the cam;
    a stiff arm having two ends, one of the ends being pivotally mounted, and the other of the ends being mounted along the axis of rotation of the wheel such that when the link arm is moved upwardly the wheel is free to disengage the cam.

* * * * *